BLEND RUBBER LATEX WITH
DRY PARTICULATE RESIN, AND, IF DESIRED,
WITH DRY PARTICULATE FILLER
AND/OR PIGMENT, TO FORM
GRANULAR FREE-FLOWING MIXTURE
↓
OPTIONALLY REMOVE BULK OF
WATER DURING BLENDING
↓
CHARGE MIXTURE TO
TWIN-SCREW EXTRUDER
↓
MASTICATE TO CONSOLIDATE MIXTURE
AND EFFECT FUSION OF
RUBBER AND RESIN
INTO SINGLE PHASE
↓
REMOVE WATER AND ANY OTHER
VOLATILES BY EVACUATION OF
MIXTURE IN TWIN-SCREW EXTRUDER
↓
EXTRUDE MIXTURE INTO
CONTINUOUS FORM, e.g. PIPE,
OR EXTRUDE AND PELLETIZE
EMERGING MIXTURE TO FORM
MOLDING PELLETS

Fig. 1

INVENTORS
ALFRED A. GUTHRIE
FERRIS E. NEWMAN
BY Robert J. Patterson
ATTORNEY

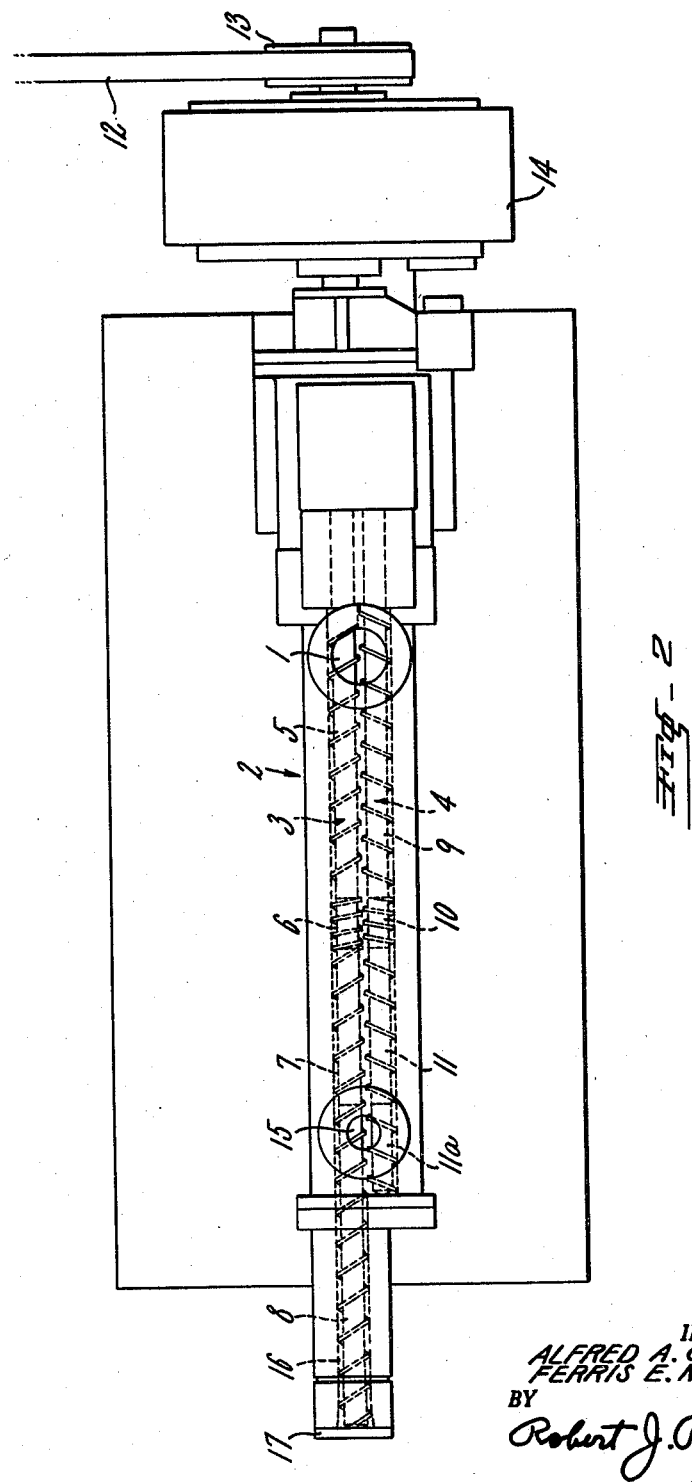

United States Patent Office 2,935,763
Patented May 10, 1960

2,935,763

METHOD OF FORMING PELLETS OF A SYNTHETIC RUBBER LATEX AND A PARTICULATE RESIN

Ferris E. Newman, New Haven, and Alfred A. Guthrie, Fort Wayne, Ind., assignors to United States Rubber Company, New York, N.Y., a corporation of New Jersey Application September 1, 1954, Serial No. 453,590

3 Claims. (Cl. 18—55)

This invention relates to an improved method of making gum plastics, i.e. compositions in which the binder is composed of a uniform homogeneous mixture of a rubber and a resin, and more particularly to an improved process of making extruded gum plastic articles or pelletized granular gum plastics adapted to be subsequently molded into the desired shape.

Heretofore gum plastics have almost invariably been prepared by milling or masticating the solid (powdered or slab) rubber with the solid resin, and with any desired fillers or pigments, using an ordinary open two-roll rubber mill or a masticatory mixer of the internal type, such as a Banbury mixer, whereby fusion blending of the rubber and resin and uniform dispersion of the filler or the like has been achieved. When the rubber used was in powdered or slab form it was usually customary to mill it on an open rubber mill to break it down to a relatively low Mooney viscosity prior to admixture with the resin and any other ingredients. This breaking down was considered to be indispensable to the attainment of a satisfactory mixture. The mixture obtained by the foregoing procedure was sheeted off in the form of slabs which were rigidified by freezing with solid carbon dioxide (often called "Dry Ice") and thereafter broken up into chunks which were fed into a granulating machine for the preparation of a granular molding material. It was necessary to dry this molding powder in an oven to remove the water condensed in the mixture by the solid carbon dioxide. The resulting granular molding material was then charged to molding or extruding equipment for preparation of the final articles.

The masticatory incorporation of rubber and resin with one another and with any desired filler or pigment, followed by the granulating procedure just described is subject to many disadvantages. It is costly and time-consuming. The masticatory treatment and the preliminary breakdown of the rubber component are expensive and moreover cause a deterioration of the physical properties of the final product by reason of the excessive breakdown of the rubber commonly performed to facilitate the mixing. The results of this conventional procedure are widely variable and non-uniform, resulting in excessive scrap. For these and other reasons, gum plastics have not heretofore been sufficiently cheap to justify their use in many applications where they would otherwise be used.

In order to make it easier to attain a uniform mixture, prior workers often resorted to the use of organic solvents, softeners or plasticizers in the preparation of gum plastics. However, the use of solvents was objectionable because of their expense and the toxicity and fire hazard incident to their use. Furthermore the use of solvents has been considered by many workers in the art to result in a permanent deterioration of the physical properties of the rubber component of gum plastics. The use of softeners or plasticizers is often deemed objectionable because they impair the physical properties of the final product and because they are subject to loss by migration, volatilization or leaching from the finished product.

It has previously been proposed to make gum plastics by commingling rubber latex and resin latex in the desired proportions and co-coagulating the latex blend whereupon the coagulum was washed and dried and subsequently mixed with the desired filler or pigment by the use of a rubber mill or a Banbury mixer. This procedure is subject to numerous objections among which are the fact that the relative proportions of rubber and resin in the coagulum are fixed at the time of coagulation so that if a different ratio of rubber to resin is desired in the final molding powder or article it is necessary to incorporate additional resin or rubber with the dried coagulum on a rubber mill or in a Banbury mixer which is expensive and not conducive to the desired uniformity in the resulting mixture. In addition, many resins which are widely used in making gum plastics are available only in solid form so that the latex blending process cannot be applied with such resins because of the difficulty, expense and impracticability of converting such resins to latex form. From the foregoing it will be seen that there is a great need in the art for a gum plastics mixing procedure which would avoid the use of solid rubber, which would be adapted to use with any of the solid resins including resins which are not prepared in latex form, which would be flexible, which would not rely upon solvents or softeners or plasticizers, which is adapted to wide variations in the rubber-resin ratio, which is adapted to be carried out at low cost, which would give products having superior physical properties, which would be adaptable to use with thermoplastic as well as thermosetting resins, which would avoid the use of solid carbon dioxide, and which could be carried out by workers having ordinary skill in the art. The principal object of our invention is to provide a process meeting such needs. Numerous other objects will more fully hereinafter appear.

In the accompanying drawings:

Fig. 1 is a self-explanatory flow diagram of a typical method of practicing our invention, and Fig. 2 is a plan view of one arrangement of compounding, milling and extruding equipment which can be used in practicing our invention.

We have discovered a new method of preparing gum plastics and extruded articles and molding pellets made therefrom, whereby the objections to prior art processes are overcome. Our invention is based upon our discovery that numerous advantages are achieved by preliminarily intimately and uniformly blending a rubber in the form of a latex with the dry particulate resin, and if desired, with any suitable filler or pigment in dry particulate form, at a temperature below that at which the rubber and the resin would undergo fusion into a single phase, to form a granular free-flowing mixture, masticating this mixture at an elevated temperature and thereby effecting consolidation of the mixture and fusion of the resin and the rubber into a single phase, removing water and any other volatiles from the mixture during or after the preliminary blending step or during the masticating step or during both steps (removal of the bulk of water and other volatiles during or after the preliminary blending and of substantially all remaining water and other volatiles by evacuation during the masticating step being by far the preferred procedure), and extruding the resulting mixture either into the continuous final form desired, e.g. pipe, rod, channel or any other desired shape, or into strands or strings which are pelletized in known manner to molding powder in subsequent molding or extrusion operations.

Our invention is based upon the discovery that new results, manifested chiefly by better physical properties in the final extruded or molded article and by materially lower cost of manufacture, are achieved by proceeding in the manner outlined above. These new results are believed to be directly attributable to our unique manner of incorporating the ingredients of the components with one another. More particularly, we believe that the use of rubber in latex form results in a complete encasement of the individual particles of resin, and of a filler (including pigment) if used, in the preliminary blending operation and that the grinding, kneading and smearing action in the subsequent masticating step results to a degree never before achieved, in fine subdivision and high attenuation of the resin and particles, uniform inter-mixture of the rubber and resin with one another, fusion blending of the rubber and resin and distribution of the resulting blend around the particles of any filler under the pressure of mastication. We believe that the step or steps of substantially completely removing water and other volatiles during the process contributes in an essential manner to the attainment of our new results. There is evidence that where traces of volatiles remain in the product leaving the extruder these result in blistering in directly extruded articles like pipe and in articles molded from the pelletized extruded mixture. In addition such traces of volatiles in the pelletized extruded mixture lengthen the time required in molding articles therefrom. As will be obvious, for commercial reasons, the molding or curing time required with molding pellets should be as short as possible.

The preliminary blending operation can be carried out in any suitable manner using any suitable equipment. We prefer to perform this step in a ribbon blender equipped with heating means, such as a heating jacket, whereby it is possible to remove a major proportion of the water, and any other volatiles present, during this step. It will of course be understood that the rate of removal of such volatiles should be such that the latex is intimately commingled with the dry solid resin, or resin and filler, and completely encases the particles thereof before water is removed to such an extent that the latex is incapable of flowing around the particles. The blending step can be conducted at a temperature ranging from atmospheric to 212° F. The temperature usually is sufficiently low that the rubber and resin do not undergo fusion into a single phase, this fusion blending being reserved for the mastication step which is carried out at a substantially higher temperature than that used in the blending step. The blending step does not effect any substantial mastication or kneading of the mixture which would result in tearing apart of the deposited rubber or the resin particles. The product of the blending step is granular and free-flowing and will be damp or dry to the touch depending upon whether drying was performed in this step or not.

If removal of water and other volatiles during the blending was not performed, it will usually be preferred to dry the mixture at this point, as in an oven, in order to remove the bulk of the water and thereby reduce the amount of water and other volatiles to be removed during the masticating step. Such drying is usually done at a temperature not higher than 212° F. and at a temperature lower than that used in the mastication step. Often it will be done at temperatures of from 140 to 212° F. This step leaves a granular free-flowing mixture.

The extent of removal of water and other volatiles during or after the preliminary blending step, but prior to our compounding-milling-extruding step, will usually be such that the mixture charged to the latter step is dry to the touch. Typically the amount of water and other volatiles in the mixture charged to this step will not exceed 1% by weight.

The extent of removal of remaining water and other volatiles by evacuation during the mastication (and extruding) step should be such that the material contains substantially no volatiles as it is extruded. It is difficult to set a numerical limit on the permissible level of volatiles at this point but it is preferably of the order of less than 0.01% of volatiles. The volatile level can be determined by finely sub-dividing a sample of the plastic mixture and heating it at 212° F. and determining the loss of weight. We prefer to carry out the mastication and evacuation of volatiles in such a way that all traces of volatiles are removed from the mixture prior to its extrusion; since even a trace can cause difficulties with blistering, with longer molding or curing time and with impairment of physical properties of the final product.

The resulting granular free-flowing mixture is now charged to the masticatory equipment which can take any suitable form but preferably is of the type shown in Fig. 2 of the drawing, which portrays a "twin-screw extruder" of the type manufactured by Welding Engineers, Inc. of Norristown, Pennsylvania. The equipment shown is generally similar to that shown in Figs. 1 to 3 of Fuller 2,615,199 except that we do not use the reverse flights shown by Fuller.

As shown in Fig. 2, the blended mixture prepared in any suitable manner is charged through opening 1 of the twin-screw compounding, evacuating and extruding device 2 which comprises main screw 3 and auxiliary screw 4. Screws 3 and 4 are of unequal length and equal diameter and are rotated in opposite directions. Main screw 3 embodies a feed portion 5, a compounding portion 6, a milling portion 7, and an extruding portion 8. Auxiliary screw 4 includes a corresponding feed portion 9, a corresponding compounding portion 10, a corresponding milling portion 11 and a short extruding portion 11a. Screws 3 and 4 are driven through the medium of belt 12, pulley 13 and reduction gear box 14. Feed portions 5 and 9 feed and compact the charged material and forward it into the compounding section where it is compounded by the action of screws 6 and 10 which have a very low pitch compared to the rest of screws 3 and 4 and subject the material to intense masticatory action and fusion blending. Thence the material passes into the milling section where it is further milled by the action of screws 7 and 11. As it nears the end of this milling section it is subjected to vacuum by a source (not shown) of vacuum applied to the milling section (and the initial portion of the extruding section) through opening 15. The vacuum withdraws the water and the other volatile components of the mixture. The action of the screws serves to continuously expose fresh portions of the mixture to the vacuum applied through opening 15, which coupled with the fact that the vacuum is applied over a substantial portion of the mixture in the milling and extruding sections, results in effective removal of remaining volatiles. It will be understood that opening 15 is connected to a suitable vacuum pump. If desired, condensing equipment for liquefying the water removed by evacuation can be provided. If desired, a screen or filter can be placed across opening 15 to reduce the possibility of plastic particles entering the vacuum equipment. At the forward end of the milling section the milling chamber merges into a conventional single-opening extrusion chamber 16 in which the extrusion screw 8 operates in the conventional manner to extrude the material through die 17. As will be obvious, die 17 can be designed to form a finished article like pipe or rod or to feed into any suitable pelletizing equipment (not shown), such as that of Street 2,614,290. The various portions of the twin-screw extruder are provided with jacketed zones for heating as desired. As will be obvious, the extrusion section must be heated to a temperature at which the mixture is extrudable but not so high, in the case where a thermosetting resin is used, as to advance such resin to insoluble infusible form prior to its extrusion. The compounding and milling sections are heated to a temperature at which fusion blending of the rubber and resin will occur.

It will be understood that the work performed on the mixture is transformed into heat and that this heat results in elevation of the temperature of the mixture.

We prefer that the several pairs of corresponding sections of the worms 3 and 4 be pitched oppositely but at identical angles, as shown in the drawing. We also prefer that they be so driven that their peripheries move downwardly together at the center.

The action in the twin-screw extruder, and particularly in the compounding and milling sections thereof, is to knead, roll and tear the mixture and at the same time to effect fusion blending and forwarding of the mixture through the successive zones of the device. If a thermosetting resin is used the temperature in the compounding section should of course not be so high as to advance it. Typically we heat the mixture in the compounding, milling and extruding sections to from 150 to 475° F. The temperature will in general be lower with mixtures containing thermosetting resins than with mixtures containing thermoplastic resins. It will be understood that our invention can be applied to mixtures containing both thermosetting and thermoplastic resins. With mixtures containing thermosetting resins a maximum temperature of about 235° F. should be observed to avoid danger of advancing the resin.

By the evacuation step we prefer to remove substantially all traces of water and any other volatiles present. Removal of volatiles at this point is greatly facilitated by the action of the mastication in finely subdividing the mixture and in continually exposing fresh surfaces to the vacuum. The importance of evacuation at this point is shown by the fact that if it is eliminated and it is attempted to remove all of the water and other volatiles during initial blending or between initial blending and charging to the twin-screw extruder, blisters appear in the extruded product. We believe that evacuation is also important because it enables a substantial reduction in the time required for molding or curing the pelletized extruded mixture.

Although we much prefer to use a twin-screw extruder such as has been described, in the broader aspects of our invention we are not restricted thereto but can employ a single screw extruder or any other means of obtaining mechanical working, grinding and kneading accompanied by evacuation and followed by extrusion.

In practicing our invention we can use any kind of rubber which is available in latex form, and which is compatible with the resin or resins used. We prefer to employ a butadiene-acrylonitrile rubbery copolymer, this type of synthetic rubber being commonly designated as Buna N. Instead, we can use rubbery copolymers containing at least 25 weight percent of aliphatic conjugated diolefin, e.g. butadiene, copolymerized with any other copolymerizable monoethylenically unsaturated monomer such as methacrylonitrile, lower alkyl acrylates, lower alkyl methacrylates, lower alkyl maleates, lower alkyl fumarates, styrene, alpha-methyl styrene, para-methyl styrene, alpha, para-dimethyl styrene, 2-vinyl pyridine, 3-vinyl pyridine, 4-vinyl pyridine, or mono-lower alkyl mono-vinyl pyridines. We can use a GR–S latex (butadiene-styrene copolymer latex) provided of course that the resin used is compatible with GR–S. Even where the resin used is not fully compatible with GR–S, but is compatible with Buna N, we can employ a mixture of Buna N latex and GR–S latex, provided the mixed rubbers are compatible with the resin or resins to form a single homogeneous or substantially homogeneous blend.

We may even, under certain conditions, use natural rubber, i.e. Hevea, latex, if it is compatible with the resin. For some reason natural rubber latex has not been widely used in making gum plastics.

We can also use neoprene latex, again provided that it is compatible with the resin.

When Buna N rubber is used in conjunction with a thermosetting phenolic resin, there is no need to employ vulcanizing agents for the Buna N because the phenolic resin appears to exert a curing action on the Buna N. The same is true of butadiene-vinyl pyridine rubbery copolymers. In the case of thermoplastic mixtures, i.e., mixtures containing no thermosetting resin, we prefer that no vulcanizing ingredients for the rubber be used so that scrap can be re-used.

Any resin which is compatible with the rubber of the latex and which is available in solid particulate form can be used. We can use any of the phenol-aldehyde resins of the novolak type which are compatible with the rubber and which are soluble and fusible but upon being heated in the presence of a methylene-yielding hardening agent such as hexamethylenetetramine ("Hexa") are capable of being converted to insoluble, infusible form. Examples of such resins are set forth in detail in Kiley 2,634,250. We prefer to employ a cashew nut shell oil-modified phenol-formaldehyde resin of the novolak type such as has been described in the Kiley patent and in Newman 2,598,289. These phenolic resins can be termed "thermosetting" because they are advanced to insoluble, infusible form by the action of heat and the hardening agent. They are to be distinguished from the resole-type phenolic resins which are entirely different chemically and which are inherently thermosetting without the use of an extraneous hardening agent and which cannot be used because the moment they are dehydrated to remove water they are advanced to the insoluble, infusible form in which they are incompatible with the rubber.

By the term "compatible" we mean that the rubber and the resin components are mutually soluble in one another, so that they can be fusion blended.

When a phenolic resin is used we always include in the mixture an appropriate proportion of the methylene-yielding hardening agent. Such resins containing "hexa" admixed therewith are available commercially. Instead of using thermosetting phenolic resins, we can use thermoplastic resins, e.g., polyvinyl acetal resins, styrene-acrylonitrile resinous copolymers, styrene-butadiene resinous copolymers, polyvinyl chloride and resinous copolymers of a major proportion of vinyl chloride and a minor proportion of a copolymerizable monomer such as vinyl acetate. (Such resins are of course synthetic materials.) As previously indicated we can use a plurality of resins or we can use both a thermosetting and a thermoplastic resin, in making a given gum plastic.

A particular advantage of our invention is that we can use resins which are not available in latex form such as the aforementioned phenolic resins or the polyvinyl acetal resins. Another example of a resin which is not in latex form is a styrene-acrylonitrile resinous copolymer supplied by the Bakelite Company (under the name "Bakelite BMC–11") in the form of relatively transparent pellets or flakes of considerable size and understood to have been made by bulk polymerization followed by casting, solidification, and breaking up of the solidified resin, rather than by emulsion polymerization followed by coagulation from the latex.

Our invention is particularly applicable in making the following rubber-resin compositions:

(1) A composition adapted to be molded into roller skate wheels, made according to Newman et al. 2,669,485 and comprising 35–60% of Buna N, 65–40% of cashew nut shell oil-modified phenol-formaldehyde resin, the foregoing percentages being based on the sum of Buna N and resin, a methylene-yielding hardening agent for the resin (almost invariably "hexa"), finely divided wood flour in amount equal to 30–60 parts per 100 parts of Buna N, and finely divided cryolite in amount equal to 10–30 parts per 100 parts of Buna N. Pigment can be included. Temperatures of from 150 to 235° F. in the mastication and extruding steps are considered best for these compositions.

(2) A composition of general application made according to Newman 2,598,289 and comprising 30-55% of Buna N, 70-45% of a cashew nut shell oil-modified phenol-formaldehyde resin, the foregoing percentages being based on the sum of Buna N and resin, a methylene-yielding hardening agent for the resin (again usually "hexa"), and diatomaceous earth in amount equal to 30-55% based on the sum of Buna N and resin. Pigment can be included if desired. Temperatures of from 150 to 235° F. appear optimum in the mastication and extrusion steps.

(3) A hard, rigid, tough, thermoplastic gum plastic material made according to Fisk 2,684,352, and consisting essentially of an unplasticized mixture of 95-70 parts of a polyvinyl acetal resin and 5-30 parts of a rubbery copolymer of butadiene and another monomer, especially Buna N. This composition may contain a few percent of pigment if desired. Temperatures ranging from 325 to 475° F. are preferred in the mastication and extrusion steps.

(4) A hard, tough, thermoplastic gum plastic material made according to Daly 2,439,202 or Romeyn et al. 2,600,024 and comprising 50-90% of a resinous copolymer of a major proportion of styrene and a minor proportion of acrylonitrile and 50-10% of Buna N which preferably is of a high gel level. Small amounts of pigment can be included. Temperatures of from 200 to 450° F. in the mastication and extrusion steps are preferred.

(5) Rigid polyvinyl chloride compositions of high impact strength, made according to copending application of Schwartz et al. Serial No. 433,272, filed May 28, 1954, now U.S. Pat. No. 2,803,621, and comprising polyvinyl chloride resin and a small amount, preferably 2-5 parts per 100 of resin, of Buna N rubber. Temperatures of from 250 to 400° F. are preferred in the mastication and extrusion steps.

In practicing our invention we can use widely varying relative proportions of rubber, resin and fillers (and/or pigments), if used. Similarly we can widely vary the concentration of rubber in the latex although we often prefer to use latices of the higher concentrations typically containing 40-60% of rubber. We proportion the latex and dry ingredients (including resin) so as to obtain good coverage of the water-insoluble powdered ingredients with the latex. Thorough encasement of the particles of the dry solids by the latex prior to removal of the water from the latex and prior to fusion blending is thought to be largely responsible for the improved results achieved by us. For this reason the proportions should be such as to achieve such encasement. It is fortunate that this result is achieved when the relative proportions of rubber, resin and filler (if used) are those which give the desired physical properties in the final product, provided the rubber is used in latex form in accordance with our invention. If it should happen that the amount of water supplied by the latex is insufficient to cause the dispersed rubber to completely encase the particles of the dry ingredients, such deficiency can be easily compensated for by using a more dilute form of latex.

As previously indicated, we believe that the mixing or blending step of our invention causes the rubber latex to flow in such a manner as to completely surround the dry solid particles before removal of the water. We believe that this takes place even when the mixing or blending means is heated for the purpose of driving off the bulk of the water.

We believe that the subsequent severe mastication of the mixture, which takes place in the twin-screw extruder or the like, causes the rubber deposited from the latex and the particulate resin to be broken down by the kneading action and to be intimately commingled with each other and with the filler and/or pigment particles and that this action is followed by fusion of the rubber and resin into a single homogeneous binding material as a result of the heat supplied during the masticating step.

Generally speaking, in the practice of our invention, we use such proportions of rubber latex and dry solids that the percentage of water furnished by the latex is equal to 4-60% by weight of the total original formulation. In many cases the water content of the initial mixture will be equal to 20-50%. Generally all of the water present in derived from the rubber latex which is usually used "as is," i.e. as received from the supplier.

The relative proportions of resin and rubber will depend upon the properties desired in the final product. Usually the resin will be equal to 45-96% and the rubber will be equal to 55-4% by weight based on the sum of these two components only.

The amount of filler or pigment or both can range from 0 to 60% by weight based on the sum of resin and rubber. In the appended claims the term "filler" is intended to include both inert filling materials and pigmenting material.

The following examples illustrate our invention more fully. All parts are by weight.

Example 1

| | Parts (dry basis) |
|---|---|
| Butadiene-acrylonitrile rubbery copolymer latex (50% solids) | 36.47 |
| Cashew nut shell oil-modified phenol-formaldehyde resin ("Durez 12687"; contains 8% hexamethylenetetramine) | 33.18 |
| Wood flour (finely divided) | 17.12 |
| Cryolite (finely divided) | 6.77 |
| Yellow iron oxide | 2.92 |
| Paraffin wax (mold lubricant) | 1.12 |

The wood flour is charged into a ribbon blender whereupon the rubber latex is added and mixed for about 2 minutes. Then the other ingredients are added and mixing is continued for about 10 minutes. The resulting granular mixture is placed in an oven and heated to about 115° F. to evaporate a major proportion of the water. The resulting mixture which is dry to the touch, is then fed into a twin-screw extruder of the type described above, wherein it is consolidated and subjected to evacuation to remove the rest of the water and any other volatiles, and from which it is extruded and pelletized. The resulting pellets are molded into roller skate wheels of the type covered by Newman et al. U.S. 2,669,485. The resulting wheels were wear-tested on a special laboratory machine in a test in which each wheel was pressed by hanging weights of 22 pounds against the periphery of a rotating wooden wheel made of laminated fir and driven at a peripheral speed of 22 miles per hour. The skate wheel being tested was mounted at an angle of 10° to the glue joints of the wood so that wear of the skate wheel was greatly accentuated.

In the test just described, skate wheels made by Example 1 showed an average weight loss in 120 hours (2640 miles) very much lower than wheels made with the identical formulation but from slab butadiene-acrylonitrile rubbery copolymer instead of latex, using the conventional mixing technique wherein the milled rubber is mixed in a Banbury mixer with the other ingredients. The high weight loss of the latter wheels is attributed to the poor uniformity of the mixture due to the great difficulty of incorporating solid rubber with the other ingredients.

Example 2

| | Parts (dry basis) |
|---|---|
| Butadiene-acrylonitrile rubbery copolymer latex (26.7% solids) | 37.5 |
| Polyvinyl formal resin ("Formvar 7/90") | 90 |
| Anti-oxidant | 2 |
| Pigment | 2 |
| | 131.5 |

The latex was added to the powdered ingredients in a ribbon blender which was operated until a uniform blend was obtained. The resulting blend was then oven-dried at 200° F. to remove the bulk of the water whereupon it was processed in the twin-screw extruder. Since the resin is thermoplastic, the mixture can be successfully extruded directly into rod, pipe or channel, or it can be pelletized as it emerges from the extruder and the resulting pellets subsequently molded in any manner.

*Example 3*

| | Parts (dry basis) |
|---|---|
| Buna N latex (50% solids) | 32.90 |
| "Durez 12687" | 27.42 |
| Diatomaceous Earth ("Dicalite L-1") | 32.91 |
| Pigment | 2.46 |
| Carnauba wax | 0.82 |
| Paraffin wax | 0.49 |

These ingredients were blended in a ribbon blender, dried to remove the bulk of the water and processed in the twin-screw extruder as before to form granular molding pellets. These were especially suitable for molding knobs used for remote control of transformers.

*Examples 4 to 6*

| Example No. | 4 | 5 | 6 |
|---|---|---|---|
| Buna N rubber (used as a 50% solids latex) | [1] 20 | [1] 16 | [1] 10.80 |
| Durez 12687 | 20 | 30 | 16.56 |
| Diatomaceous earth | 20 | 14 | 10.00 |
| Zinc stearate | 0.3 | 0.25 | |
| Anti-oxidant (for rubber) | 0.3 | 0.3 | |
| Pigment | 1.8 | 3.0 | 0.18 |
| Wax | | 0.25 | 0.27 |

[1] Dry.

These ingredients were mixed and processed exactly as in Example 3.

*Examples 7 to 9*

| Example No. | 7 | 8 | 9 |
|---|---|---|---|
| Buna N rubber latex (22% solids) | [1] 25 | [1] 25 | [1] 13 |
| Styrene-acrylonitrile (68-32) resinous copolymer [2] | | 50 | |
| Styrene-acrylonitrile (76-24) resinous copolymer [2] | 75 | 25 | |
| Styrene-acrylonitrile (90-10) resinous copolymer [2] | | | 87 |
| Pigment | 2 | 2 | 2 |
| Anti-oxidant (for rubber) | 0.5 | 0.5 | 0.5 |
| 2,6-di-t-butyl-p-cresol ("Deenax") | 0.2 | 0.2 | 0.2 |
| Zinc stearate | 0.5 | 1.2 | 0.5 |

[1] Dry.
[2] Supplied as a powder, made by emulsion polymerization and coagulation from latex.

These ingredients were mixed and processed in the same way as in Example 2. Extrusion into either pellets or the final extruded shape is possible with these thermoplastic materials.

*Example 10*

This example illustrates the use of the above-mentioned pellet or flake form of styrene-acrylonitrile resin. The following formulation is employed:

| | Parts (dry basis) |
|---|---|
| Buna N rubber latex (22% solids) | 25 |
| Styrene-acrylonitrile (76-24) resinous copolymer [1] | 37.5 |
| "Bakelite BMC" (styrene-acrylonitrile resinous copolymer [2]) | 37.5 |
| Pigment | 2 |
| Anti-oxidant | 0.5 |
| 2,6-di-t-butyl-p-cresol ("Deenax") | 0.2 |
| Zinc stearate | 0.5 |

[1] Supplied as a powder, made by emulsion polymerization and coagulation from latex.
[2] Supplied in form of relatively large flakes or pellets.

These ingredients were processed in the same way as before.

*Example 11*

| | Parts (dry basis) |
|---|---|
| Buna N latex (50% solids) | 5 |
| Polyvinyl chloride ("Marvinol VR-10") | 100 |
| Stabilizers for resin | 8 |
| Zinc stearate | 0.25 |
| White mineral oil | 2 |

The foregoing ingredients were mixed and processed in the same way as in Example 2. The mixture was very well suited to direct extrusion as pipe. The formulation is of the type known as a "rigid vinyl formulation." If desired it can be pelletized as extruded and subsequently molded or extruded.

From the foregoing description many advantages of our invention will be obvious to those skilled in the art. The principal advantage is that the invention provides a less expensive way of manufacturing gum plastics, this being attributable to the fact that rubber in latex form is substantially cheaper than rubber in slab form or in powdered form, due to the fact that the preparation of the mixture fed into the twin-screw extruder is not costly, and to the fact that the masticating, fusion and extrusion, coupled with water removal by evacuation, are effectively and inexpensively carried out in the twin-screw extruder or the like. Our process avoids the necessity of coagulating the latex by a coagulant which adds to the cost. Our process avoids the use of solvents for the rubber or resin which are objectionable because of their cost and because they cause degradation of the properties of the rubber. Our process makes it unnecessary to use softeners or plasticizers which would often be objectionable because of migration or loss and because they impair the physical properties of the product. The product of our invention is much superior to prior products in physical properties and in uniformity. Our process offers greater flexibility and much better control of uniformity of product. The use of rubber in latex form and the use of the twin-screw extruder or the like bring about a more uniform dispersion of rubber throughout the mixture. Thermoplastic formulations made by our invention can be extruded directly into final form. Thermoplastic and thermosetting mixtures can be pelletized and the pelletized material is ready for use in the mold as soon as it leaves the pelletizing device which can conveniently be mounted on the extruder head. Our process is not restricted to the use of solid rubbers. Our process makes it possible to use resins which are available only in solid form. Our process makes it possible to use unusual forms of resin such as the above-mentioned solid granular form of styrene-acrylonitrile resinous copolymer which is considerably cheaper than other forms of this copolymer. Our process makes it possible to use rubber of any Mooney viscosity and thus makes it possible to use rubber of high Mooney viscosity whereby better physical properties can be achieved. Our process avoids the necessity of breaking down the rubber to low Mooney viscosity, as was necessary when solid rubber was used heretofore, and this greatly contributes to improved physical properties. Our process is rapid. There is no problem of sticking to the equipment with our process. Our process opens up to a much wider extent than heretofore the whole field of gum plastics and makes their manufacture and use much more practical and much cheaper. More other advantages will appear to those skilled in the art.

Having thus described our invention, what we claim and desire to protect by Letters Patent is:

1. A method of making molding pellets comprising providing a dry particulate fusible synthetic resin selected from the group consisting of cashew nut shell oil-modified phenol-formaldehyde resin and polyvinyl chloride resin, completely encasing individual particles of said resin with a rubbery copolymer of butadiene and acrylonitrile in latex form by blending the said resin in dry, particulate form and the said latex at a temperature below that at which the said resin and rubbery copolymer undergo fusion into a single phase, to form directly a granular free-flowing mixture in which the said resin and rubbery copolymer exist as separate phases, the proportion of said latex being such that the water content of the resulting granular free-flowing mixture is from 4 to 60%, evaporating the bulk of the water from the mixture, charging the mixture to an extrusion device wherein the mixture is masticated while being heated to an elevated temperature which is sufficient to effect consolidation of the mixture and fusion of the said resin and rubbery copolymer into a single phase, subjecting the mixture to vacuum within the extrusion device during said mastication and heating to remove residual water, thereafter passing the mixture through a die of the extrusion device and pelletizing the emerging mixture to form molding pellets.

2. A method as in claim 1 in which the said resin is cashew nut shell oil-modified phenol-formaldehyde resin.

3. A method as in claim 1 in which the said resin is polyvinylchloride resin.

References Cited in the file of this patent

UNITED STATES PATENTS

| | | |
|---|---|---|
| 1,821,703 | Goodenow | Sept. 1, 1931 |
| 2,598,289 | Newman | May 27, 1952 |
| 2,600,024 | Romeyn et al. | June 10, 1952 |

FOREIGN PATENTS

| | | |
|---|---|---|
| 451,023 | Great Britain | July 24, 1936 |

OTHER REFERENCES

O'Connor et al.: "Latex Compounding of GR-S," Rubber Age, volume 54, No. 5, pages 423–427, February 1944 (only page 424 relied upon).

Rubber Age, page 73, "Apparatus for Incorporation of Carbon Black Into GR-S Latex" (October 1944).